(12) United States Patent
Engelhardt et al.

(10) Patent No.: US 7,054,062 B2
(45) Date of Patent: May 30, 2006

(54) DOUBLE CONFOCAL SCANNING MICROSCOPE

(75) Inventors: Johann Engelhardt, Bad Schönborn (DE); Jörg Bewersdorf, Heidelberg (DE); Hilmar Gugel, Dossenheim (DE); Juergen Hoffmann, Wiesbaden (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 424 days.

(21) Appl. No.: 09/826,712

(22) Filed: Apr. 5, 2001

(65) Prior Publication Data

US 2001/0030803 A1    Oct. 18, 2001

(30) Foreign Application Priority Data

Apr. 13, 2000   (DE) ................................. 100 18 256

(51) Int. Cl.
 *G02B 21/06* (2006.01)
 *G02B 21/00* (2006.01)
(52) U.S. Cl. ........................ 359/389; 359/368; 359/385
(58) Field of Classification Search ........ 359/368–371, 359/385–389, 831–837, 656–661
See application file for complete search history.

(56) References Cited

U.S. PATENT DOCUMENTS

| 4,965,441 A | * | 10/1990 | Picard |
| 5,386,112 A | * | 1/1995 | Dixon |
| 5,790,242 A | * | 8/1998 | Stern et al. ................ 356/4.04 |

FOREIGN PATENT DOCUMENTS

| DE | 39 18 412 | * | 2/1980 |
| EP | 0 491 289 A1 | | 12/1991 |
| JP | 2001-272605 | * | 10/2001 |

* cited by examiner

*Primary Examiner*—Thong Q Nguyen
(74) *Attorney, Agent, or Firm*—Houston Eliseeva LLP

(57) ABSTRACT

The present invention concerns a double confocal scanning microscope (1) having an illuminating beam path (2) of at least one light source (3), and a detected beam path (4) of at least one detector (5), and in order to achieve almost the theoretically possible resolution capability, in particular in the context of multi-color fluorescence applications, is characterized in that the optical properties in particular of the components (6, 10, 13, 14) arranged in the beam path are coordinated with one another in such a way that the accumulated aberrations, with respect to the optical axis (33) and/or at least one surface (18, 19, 20) in the specimen region, are at least of the order of magnitude of the theoretically achievable resolution capability.

12 Claims, 2 Drawing Sheets

DOUBLE CONFOCAL SCANNING MICROSCOPE

CROSS REFERENCE TO RELATED APPLICATIONS

This invention claims priority of a German filed patent application DE 100 18 256.9 which is incorporated by reference herein.

FIELD OF THE INVENTION

The present invention concerns a double confocal scanning microscope having at least one light source defining an illuminating beam path and at least one detector defining detection beam path.

BACKGROUND OF THE INVENTION

Double confocal scanning microscopes are known from EP 0 491 289. In double confocal scanning microscopy, light from a light source is divided into two partial beams, each partial beam being focused by way of an objective onto a common specimen point. The two objectives are arranged on different sides of the specimen plane that is common to them. At the specimen point or the detection pinhole, the interferometric illumination causes the formation of an interference pattern that, in the context of constructive interference, exhibits a principal maximum and several secondary maxima. Because of the interferometric illumination, it is possible with a double confocal scanning microscope to achieve increased axial resolution as compared to a conventional scanning microscope. The term "axial resolution" will be used hereinafter to refer to the resolution in the direction of the optical axis.

Especially in the context of multi-color fluorescence applications, however, the axial resolution that is experimentally achievable with a generic double confocal scanning microscope is hitherto less than the theoretically possible axial resolution.

SUMMARY OF THE INVENTION

It is therefore the object of the present invention to describe a double confocal scanning microscope with which, especially in the context of multi-color fluorescence applications, at least almost the theoretically possible resolution capability can be achieved.

The method according to the present invention of the generic type achieves the aforesaid object by confocal scanning microscope which comprises: at least one light source defining an illuminating beam path, at least one detector defining detection beam path, a plurality of components arranged in the illuminating beam path and the detection beam path wherein the optical properties of the components arranged in the beam path are coordinated with one another and the accumulated aberrations, with respect to the optical axis 33 and/or at least one surface in the specimen region, are at least of the order of magnitude of the theoretically achievable resolution capability.

What has been recognized firstly according to the present invention is that the reason for the difference between the experimentally achievable and theoretically possible resolution capabilities in the context of double confocal scanning microscopy lies in particular in the aberrations of the components arranged in the beam path. The greatest contribution thereto is generally made by the microscope objectives being used, which have, for example, a longitudinal chromatic aberration of approx. 150 nm over a wavelength range from 450 nm to 650 nm. This longitudinal chromatic aberration alone is, considered of itself, already greater than the theoretically achievable axial resolution capability of approx. 100 nm.

According to the present invention, therefore, the optical properties of the components arranged in the beam path are coordinated with one another in such a way that the accumulated aberrations are at least of the order of magnitude of the theoretically achievable resolution capability. The sum of one type of aberration in the components to be incorporated into an optical calculation constitutes the accumulated aberrations. The theoretically achievable resolution capability in the context of a double confocal scanning microscope depends, like the resolution capability of a conventional microscope, on the wavelength of the light and the numerical aperture of the microscope objective being used. In a typical fluorescence application in the biomedical field, the lateral resolution capability of a confocal scanning microscope is approx. 200 nm, and the axial resolution capability approx. 600 to 800 nm. The term "lateral resolution" will be used hereinafter to refer to the resolution in the focal plane. The lateral resolution capability of a double confocal scanning microscope is substantially the same as that of a confocal scanning microscope, but the axial resolution capability of a double confocal scanning microscope lies in a range of approx. 100 to 200 nm. In order to achieve a maximum resolution capability, it is thus the values of the theoretical resolution capability of a double confocal scanning microscope which define the order of magnitude of the coordination range of the components of the double confocal scanning microscope according to the present invention arranged in the beam path. This order of magnitude of the coordination range can, however, fluctuate by a factor of as much as 10, depending on the demands placed on the double confocal scanning microscope. Coordination of the components arranged in the beam path can accordingly be accomplished in such a way that the accumulated aberrations, for example in the axial direction, lie between 10 and 1000 nm.

BRIEF DESCRIPTION OF THE DRAWINGS

There are various ways of advantageously embodying and developing the teaching of the present invention. In conjunction with the explanation of the preferred exemplary embodiments of the invention with reference to the drawings, an explanation is also given of generally preferred embodiments and developments of the teaching. In the drawings.

DETAILED DESCRIPTION OF THE INVENTION

Figure 1:
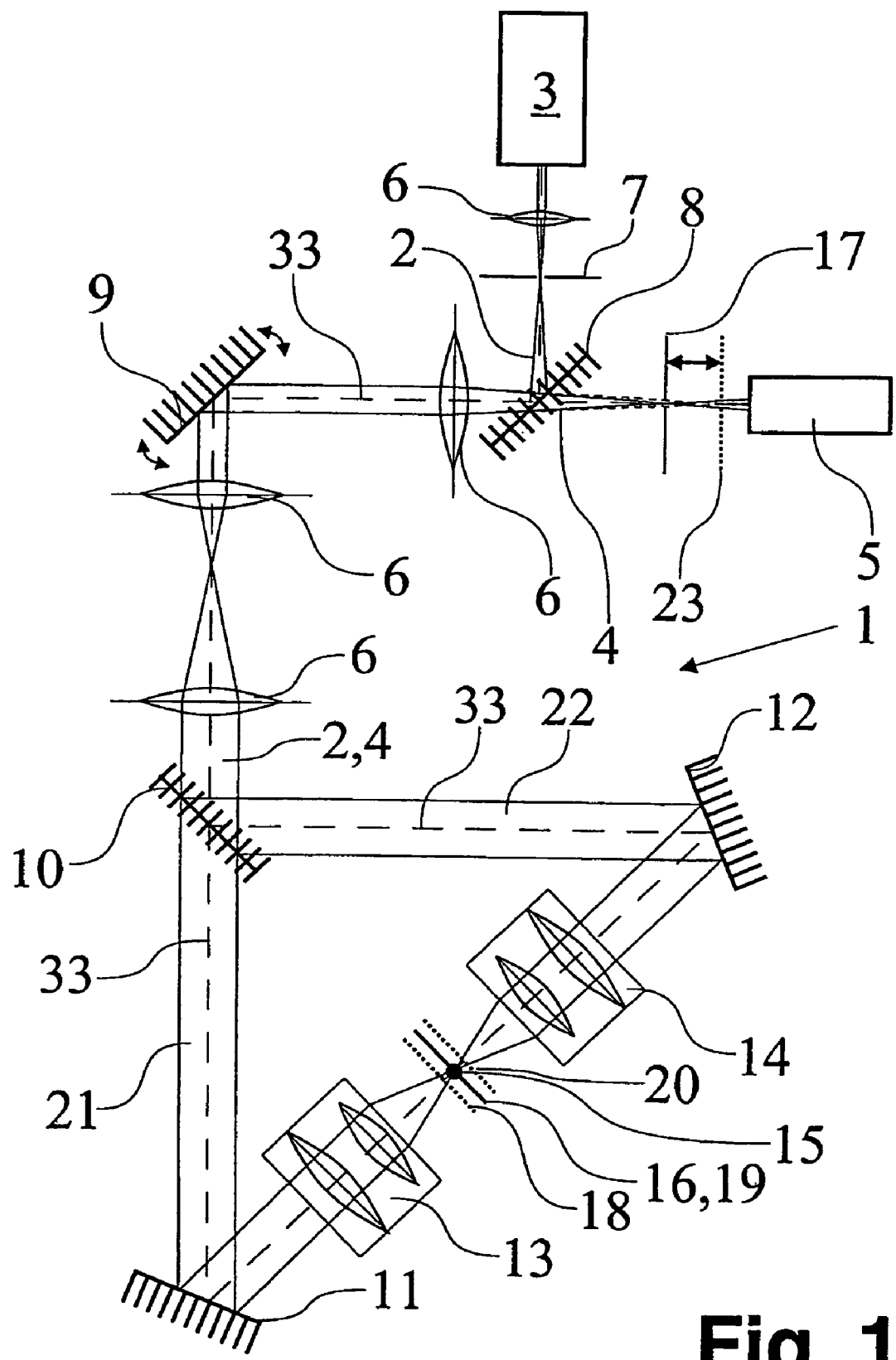
FIG. 1 schematically depicts an exemplary embodiment of a double confocal scanning microscope according to the present invention.

Coordination of the accumulated aberrations is accomplished in this context with respect to the optical axis and/or with respect to at least one surface in the specimen region. In terms of coordination of the accumulated aberrations with respect to the optical axis, provision is made for a lateral error correction, preferably in rotationally symmetrical fashion; in terms of coordination of the accumulated aberrations with respect to at least one surface in the specimen region, an axial error correction is preferably provided for.

In very general terms, the surface in the specimen region is a calculated reference magnitude. The surface can have any desired shape and location, for example a slightly curved surface of a spherical segment, of an ellipsoid, of a paraboloid, or of a hyperbolic paraboloid. The surface could also be a plane. The surface could be oriented symmetrically with respect to a straight line lying in the focal plane or with respect to the optical axis. Different surfaces in the specimen region can be provided for different types of aberration.

In a concrete embodiment, the surface in the specimen region, embodied as a plane, is at least partially coincident with the focal plane of the objectives. Ideally, the accumulated aberrations of the components arranged in the beam path are corrected for the entire image field of the objectives. A partial coincidence of the surface in the specimen region with the focal plane of the objectives is also conceivable; for example, as a result of the boundary conditions of the optical calculation, a correction may be possible only for a portion of the objective image field.

In a particularly preferred embodiment, at least two surfaces in the specimen region arranged symmetrically with respect to the focal plane are provided. In this case one specific type of aberration could be corrected with respect to one surface in the specimen region, and another type of aberration could be corrected with respect to another surface in the specimen region. Because of the optical properties of the components arranged in the beam path, the arrangement of the surfaces in the specimen region is generally symmetrical; in this embodiment the surfaces are preferably arranged symmetrically with respect to the focal plane.

The components of the entire beam path can be taken into consideration for the correction of the accumulated aberrations. This would thus encompass the components that are arranged between the light source and the detector in the beam path of the double confocal scanning microscope. The error properties of the light source and/or of the detector can also be taken into consideration in the correction. In particular, the excitation pinhole and/or detection pinhole can be used for the correction, for example in order to compensate for simple lateral and/or axial offset errors.

In an alternative embodiment, the components of the beam path of the interferometer are taken into consideration for the correction of the accumulated aberrations. This encompasses in particular the principal beam splitter, the deflection mirrors, and the objectives of the interferometer. A correction of the accumulated aberrations of the components of the partial beam paths of the interferometer could also be provided for. This would be necessary in particular if, for example, the lengths of the optical paths of the partial beam paths of the interferometer are different, or if one optical component is arranged in only one of the partial beam paths of the interferometer.

In particularly advantageous fashion, the components of the specimen receptacle can be taken into consideration for the correction of the accumulated aberrations. These include, in particular, the cover glasses between which the specimen being detected is located. Appropriate selection of the refractive index, dispersion properties, and/or thickness of the cover glasses can thus promote correction of the accumulated aberrations of the entire system. In this context, the planarity of the cover glasses may play an important role; provision could also be made to use cover glasses having different properties.

The immersion medium is to be taken into consideration for the correction of the accumulated aberrations. The "immersion medium" is to be understood on the one hand as the medium that is present between an objective and a cover glass. On the other hand, it is the embedding medium which directly surrounds the specimen being detected, or is present between the cover glass and the specimen and optionally fixes the specimen. For the correction of the accumulated aberrations, it may be advantageous to select different optical properties for the two immersion media; in general, however, especially for ease of handling, only one immersion medium is used. All common immersion media are suitable as the immersion medium, for example water, glycerol, or oil.

In a very particularly advantageous embodiment, the accumulated aberrations of the individual partial beam paths of the interferometer are made opposite to one another. This could be provided for only one type of aberration; opposite correction of all the accumulated aberrations of the individual partial beam paths of the interferometer is also conceivable.

In particular, the accumulated axial aberrations of the individual partial beam paths of the interferometer are made opposite to one another with respect to at least one surface in the specimen region parallel to the focal plane of the objectives. This type of correction may be illustrated using the example of longitudinal chromatic aberration (images of different colors or wavelengths lie at different points on the optical axis). In this context, the one partial beam path, with the microscope objective associated with it, has an accumulated longitudinal chromatic aberration in which the focal planes for shorter-wavelength illuminating light lie between the microscope objective and its calculated focal plane. The focal planes of the longer-wavelength illuminating light lie, with respect to the calculated focal plane of the microscope objective, on the side facing away from the microscope objective. Correction of the accumulated longitudinal chromatic aberration of the other partial beam path, and of the other microscope objective associated with that partial beam path, is to be performed in exactly opposite fashion, i.e. the focal planes for longer-wavelength illuminating light lie, in the case of this partial beam path, between the microscope objective and the calculated focal plane of that microscope objective. The focal planes of the shorter wavelengths lie on the side facing away from the calculated focal plane of that microscope objective. Since the two beam paths and microscope objectives are oriented with respect to one another in such a way that light of a specific wavelength focuses onto one common point in the calculated focal plane, the result of the opposite correction of the components of the partial beam paths is that light of other wavelengths focuses beyond the calculated focal plane of the two microscope objectives, at one point in each case. Assuming simultaneous illumination with three different wavelengths, three different illumination foci would thus form along the optical axis. The illumination focus of the shorter-wavelength light would be located closer to the one microscope objective; the illumination focus of the middle-wavelength light would, if applicable, be located in the common focal plane; and the illumination focus of the longer-wavelength illuminating light would be located closer to the other microscope objective. With this type of error correction, the individual foci of each illuminating wavelength used in the partial beam paths must be coincident at least as to order of magnitude with the theoretically achievable resolution capability. In the case of the double confocal scanning microscope, the chromatically differently located illumination foci are to be taken into consideration on the detector side; in other words, for example after corresponding chromatic splitting of the detected light, a detection pinhole is arranged for each illumination focus at the confocally corresponding point.

In similar fashion, the accumulated lateral aberrations of the individual partial beam paths of the interferometer can be made opposite to one another with respect to the optical axis. Opposite correction of the accumulated axial and/or lateral aberrations can be taken into account using digital image processing methods during and/or after specimen detection. Corresponding deconvolution operations can be used.

Alternatively or additionally, at least one optically adaptive component is provided for the correction of the accumulated aberrations. The optically adaptive component could be arranged in the illuminating beam path, the detected beam path, or the interferometer of the double confocal scanning microscope, and could be embodied as either a reflective or a transilluminated component. The optically adaptive component could be a phase-conjugated mirror and/or a liquid crystal device (LCD) element and/or a color LCD element and/or a digital micromirror (DMD) and/or a grating light valve (GLV) and/or a deformable mirror.

In particularly advantageous fashion, an application-dependent correction of the accumulated aberrations can be accomplished by way of the components of the optical beam path that are introduced for detection purposes, along with the specimen, into the beam path of the double confocal scanning microscope, i.e. in particular the cover glasses and/or the immersion media. For example, a specific type of aberration could accordingly be corrected by way of the components of the beam path of the interferometer, whereas an application-specific fine tuning of the remaining aberrations could be accomplished by way of the respective use of corresponding cover glasses. This would make it possible, in very particularly advantageous fashion, to expand the usability of a double confocal scanning microscope of this kind. Additionally or alternatively, the use of an optically adaptive component could make possible versatile utilization of the confocal scanning microscope according to the present invention.

Provision is made in very general terms for a correction of the image sharpness errors and/or image scale errors and/or chromatic aberrations of the optical components. Provision is specifically made for the spherical aberration and/or astigmatism and/or image field curvature and/or distortion and/or coma of the optical components to be corrected. Correction of the chromatic aberrations encompasses, in particular, longitudinal chromatic aberrations and/or transverse chromatic aberrations and/or chromatic magnification errors. Correction of the chromatic aberrations is provided for a wavelength range that can extend from 200 nm to 2000 nm.

In addition to aberration correction of the components arranged in the beam path, provision is made for coordination of the polarization properties of the optical components. By way of this coordination, an optimization of the illuminating and/or detected interference pattern can be achieved; this in particular makes it possible to increase the resolution capability of the double confocal scanning microscope. Polarization-influencing media such as, for example, $\lambda/2$ plates and $\lambda/4$ plates can also be provided in the beam path.

In a particularly preferred embodiment, at least one optical component is positionable. This is preferably the detection pinhole; positioning of the excitation pinhole or another component in the beam path of the double confocal scanning microscope is also conceivable. Suitable positioning of a corresponding optical component allows any remaining residual error in the accumulated aberration correction to be compensated for.

In particular in order to compensate for any remaining longitudinal chromatic aberration, provision is made for positioning of the detection pinhole in the axial direction. In the positioning of the detection pinhole, design measures are taken so that no lateral offset occurs during the axial positioning of the detection pinhole. Lateral offset of the detection pinhole would result, in some circumstances, in a reduction in signal yield, so that in the event of any unwanted lateral offset as a result of the axial positioning of the detection pinhole, that offset must be compensated for with a correction means. That correction means could, for example, comprise a displacement stage which can position the detection pinhole with a corresponding accuracy or resolution along two directions transverse to the optical axis. The tilting of a beam splitter or of a mirror could additionally or alternatively compensate for any unwanted lateral offset of the detection pinhole.

In a particularly advantageous embodiment, the detection pinhole is embodied as a chromatically selective component. This component could, for example, be fabricated from a transparent substrate onto which is applied a coating that is opaque only to light of the wavelength for which the pinhole is intended to be effective. Where the opening of the detection pinhole is usually provided, the substrate is not coated. At that point the light that is to be detected can pass through the chromatically selective component and can be detected by a detector.

Advantageously, a corresponding chromatically selective component is provided for each detected wavelength or each detected wavelength region. Each chromatically selective component is arranged in the detected beam path at the point where the illumination focus confocally corresponding to the respective detected wavelength region or the respective detected wavelength is located. For example, three different chromatically selective components could be arranged in stationary fashion one behind another along the optical axis, making possible a sequential detection of the various detected wavelength regions. This means that the specimen is first illuminated with the first illuminating wavelength for which only the first chromatically selective component acts as a detection pinhole. The other two chromatically selective components are almost transparent to the first detected wavelength region, so that the detected light corresponding to the first illuminating wavelength is detected by the detector arranged after the chromatically selective components. This first detection is followed by a second, in which the specimen is illuminated with illuminating light of a second illuminating wavelength. The chromatically selective component corresponding to the second detected wavelength region acts as a detection pinhole for the detected light that is now to be detected, which is also detected by the same detector. There follows, in similar fashion, a third detection of the same specimen with illumination by a third illuminating wavelength, the third chromatically selective component now acting as a detection pinhole for the detected light corresponding to the third illuminating wavelength.

Simultaneous detection of several detected wavelength regions is possible with a multi-band detector or spectrometer arranged after the chromatically selective components. Each chromatically selective component acts, considered of itself, as a detection pinhole for the detected wavelength region designed for it. What is therefore present after passage through the chromatically selective components is only the confocal portion of the detected light of all the detected wavelength regions, which can be accomplished by way of spectral splitting with subsequent detection using a multi-band detector or a spectrometer.

FIG. 1 shows a double confocal scanning microscope 1 having an illuminating beam path 2 of a laser light source 3 and a detected beam path 4 of a detector 5. Illuminating light from light source 3 is focused by lens 6 onto excitation pinhole 7, and reflected by dichroic beam splitter 8 in the direction of scanning device 9. The illuminating light is divided by the beam splitter of interferometer 10 into two partial beams which are each reflected at a mirror 11, 12. The illuminating light is focused through the two microscope objectives 13, 14 onto a common point 15 which is located in focal plane 16 that is common to the two microscope objectives 13, 14. The fluorescent light, excited by the interferometric illumination, from the specimen located between the two microscope objectives 13, 14 travels along illuminating beam path 2 in the opposite direction and passes through dichroic beam splitter 8, since the fluorescent light from the specimen has a different wavelength than the illuminating light. Detection pinhole 17, arranged after dichroic beam splitter 8, is arranged in confocally conjugated fashion with excitation pinhole 7, so that only fluorescent light from focus region 15 is detected by detector 5.

According to the present invention, the optical properties of components 6, 10, 13, 14 arranged in the beam path are coordinated with one another in such a way that the accumulated aberrations, with respect to surfaces 18, 19, 20 in the specimen region, are at least of the order of magnitude of the theoretically achievable resolution capability.

Surface 19 is coincident, over the entire objective image field, with focal plane 16 of the two microscope objectives 13, 14. The two surfaces 18, 20 are arranged symmetrically with respect to focal plane 16. In the exemplary embodiment of double confocal scanning microscope 1 shown in FIG. 1, the components of partial beam paths 21, 22 of the interferometer are taken into consideration for the correction of the accumulated aberrations. In this context, the accumulated axial aberrations of the individual partial beam paths 21, 22 of the interferometer are made opposite to one another with respect to surfaces 18, 19, 20 in the specimen region that are parallel to focal plane 16. The axial aberrations are the longitudinal chromatic aberrations of objectives 13, 14. Laser light source 3 emits light at illuminating wavelengths of 488 nm, 567 nm, and 647 mm. Microscope objective 13 is corrected in such a way that it focuses the light at the 488 nm illuminating wavelength of laser light source 3 to a point that is located in surface 18. The focus with respect to the 488 nm illuminating wavelength of laser light source 3 thus lies between objective 13 and its focal plane 16. Objective 14 is corrected in such a way that (assuming appropriate alignment) it also focuses the light at the 488 nm illuminating wavelength of laser light source 3 to a point that is located in surface 18. The focal point of objective 14 for light at the 488 nm illuminating wavelength of laser light source 3 is accordingly located beyond focal plane 16 of objective 14. Objective 13 focuses light at the 647 nm illuminating wavelength of laser light source 3 onto a point that is located in surface 20 in the specimen region, which thus lies beyond focal plane 16 of objective 13. The light at the 647 nm illuminating wavelength of laser light source 3 is focused by objective 14 to a point in surface 20 in the specimen region, so that the focus of the light at the 647 nm illuminating wavelength of objective 14 lies between focal plane 16 and objective 14. Focus 15 of both microscope objectives 13, 14 for the light at the 567 nm illuminating wavelength of laser light source 3 lies in surface 19 in the specimen region, which is coincident with focal plane 16. Microscope objectives 13, 14 are aligned with one another in such a way that the corresponding foci of the two microscope objectives 13, 14 in the respective surfaces 18, 19, 20 are coincident. Simultaneous illumination with light at the three illuminating wavelengths of laser light source 3 thus results in three foci, with which the specimen is scanned. The accumulated aberrations with respect to the three surfaces 18, 19, 20 in the specimen region are each of the order of magnitude of the theoretically achievable resolution capability, which is 100 nm in the axial direction.

Double confocal scanning microscope 1 shown in FIG. 1 is configured in such a way that detection pinhole 17 is positionable in the axial direction. The alternative position of detection pinhole 17 corresponding to the portion of detected beam path 4 drawn with dashed lines is also drawn with dashes and labeled 23. The portion of detected beam path 4 drawn with dashed lines is the detected light corresponding to the 488 nm illuminating wavelength. The positioning of detection pinhole 17 does not cause any lateral offset.

Figure 2:
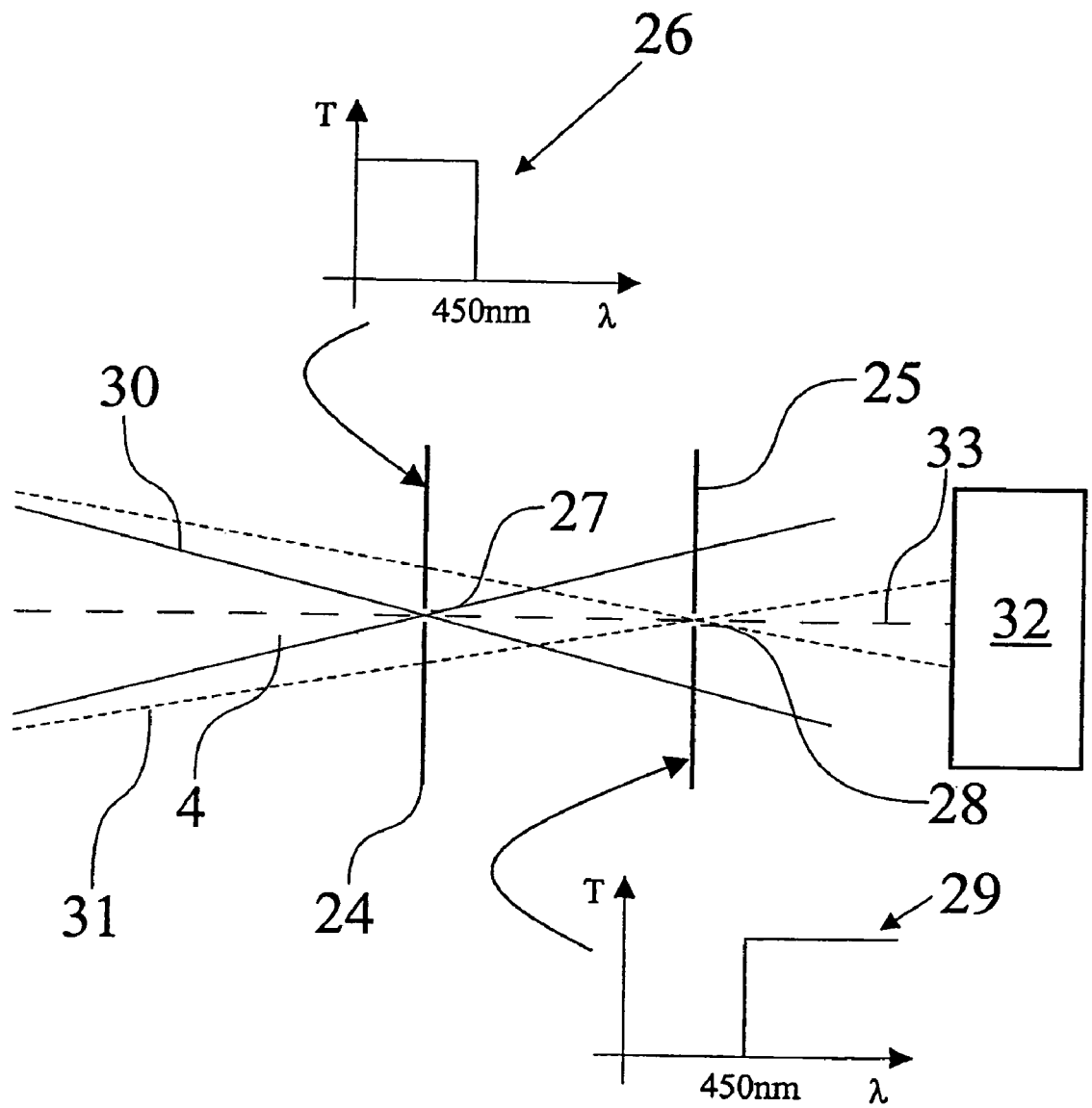
FIG. 2 schematically depicts two chromatically selective components in the detected beam path of a double confocal scanning microscope.

FIG. 2 schematically depicts a portion of detected beam path 4 of a double confocal scanning microscope. In detected beam path 4, two detection pinholes are embodied as chromatically selective components 24, 25. Chromatically selective component 24 is equipped with a coating that exhibits high transmission for all wavelengths that are less than 450 nm, and low transmission for all wavelengths that are greater than 450 nm (low-pass characteristic). The diagram in FIG. 2 shows transmission characteristic 26 of chromatically selective component 24 as a function of wavelength λ. The substrate of chromatically selective component 24 is not coated at point 27, so that chromatically selective component 24 acts as a detection pinhole for light having a wavelength greater than 450 nm.

Chromatically selective component 25 has a high-pass characteristic, i.e. the substrate of chromatically selective component 25 is coated in such a way that its transmission T is high for light at wavelengths greater than 450 nm, and is low for light at wavelengths less than 450 nm. The substrate is not coated at aperture opening 28, so that the chromatically selective component acts as a detection pinhole for all wavelengths that are less than 450 nm. Transmission characteristic 29 of chromatically selective component 25 is evident from the other diagram in FIG. 2.

Detected light 30 for which chromatically selective component 24 acts as detection pinhole, and detected light 31 for which chromatically selective component 25 acts as detection pinhole, passes through the two detection pinholes 27, 28 and is detected simultaneously by multi-band detector 32.

In conclusion, be it noted very particularly that the exemplary embodiments discussed above serve merely to describe the teaching claimed, but do not limit it to the exemplary embodiments.

What is claimed is:

1. A double confocal scanning microscope for examining a specimen, the microscope comprising:
    at least one light source defining an illuminating beam path and emitting coherent light of various wavelengths;
    at least one detector defining detection beam path; and
    two corrected microscope objectives defining an optical axis, a beam splitter, and a lens arranged in the illuminating beam path and the detection beam path,
    wherein the two corrected microscope objectives have optical properties and are arranged opposite of each other relative to a specimen, so that the longitudinal chromatic aberrations of the two corrected microscope objectives with respect to the optical axis are almost identical for the two microscope objectives, and wherein a resolution of the microscope is at least the order of magnitude of a theoretically achievable resolution of the microscope.

2. The scanning microscope as defined in claim 1, wherein the longitudinal chromatic aberrations of the two corrected microscope objectives are reduced with regard to a second plane being at least partially coincident with a focal plane of the two microscope objectives for light of a second wavelength.

3. The scanning microscope as defined in claim 2, wherein the second plane is symmetrically disposed between a first and a third planes, wherein the first plane is a focal plane of light of a first wavelength and wherein the third plane is a focal plane of light of a third wavelength.

4. The scanning microscope as defined in claim 3, wherein reduction of the chromatic aberrations occurs for the light of the first, second and third wavelengths selected from a wavelength range from about 200 nm to about 2000 nm.

5. The scanning microscope as defined in claim 3, wherein polarization properties of the two microscope objectives disposed along the optical axis, the beam splitter, and the lens are coordinated with one another in such a way that the light of the first, second and third wavelengths is focused on the first, second and third plane accordingly.

6. The scanning microscope of claim 3, wherein the first wavelength is about 488 nm, the second wavelength is about 567 nm, and the third wavelength is about 647 nm.

7. The scanning microscope as defined in claim 1, characterized in that the beam splitter of an interferometer is provided in the illuminating beam path and the detection beam path, thereby defining a first and a second individual partial beam paths along which the accumulated aberrations of the interferometer are made opposite to one another.

8. The scanning microscope as defined in claim 1, further comprising a detection pinhole and a dichroic beam splitter detecting the illumination beam path, wherein a position of at least the dichroic beam splitter or a position of at least the detection pinhole can be altered.

9. The scanning microscope as defined in claim 8, wherein the detection pinhole is embodied as at least one chromatically selective component.

10. The scanning microscope as defined in claim 9, wherein at least one chromatically selective component is provided for each detected wavelength region.

11. The scanning microscope as defined in claim 9, further comprising a multi-band detector disposed after the chromatically selective component.

12. The scanning microscope of claim 1, wherein the theoretically achievable resolution capability of the microscope is about 100 nm.

* * * * *